Figure 3:
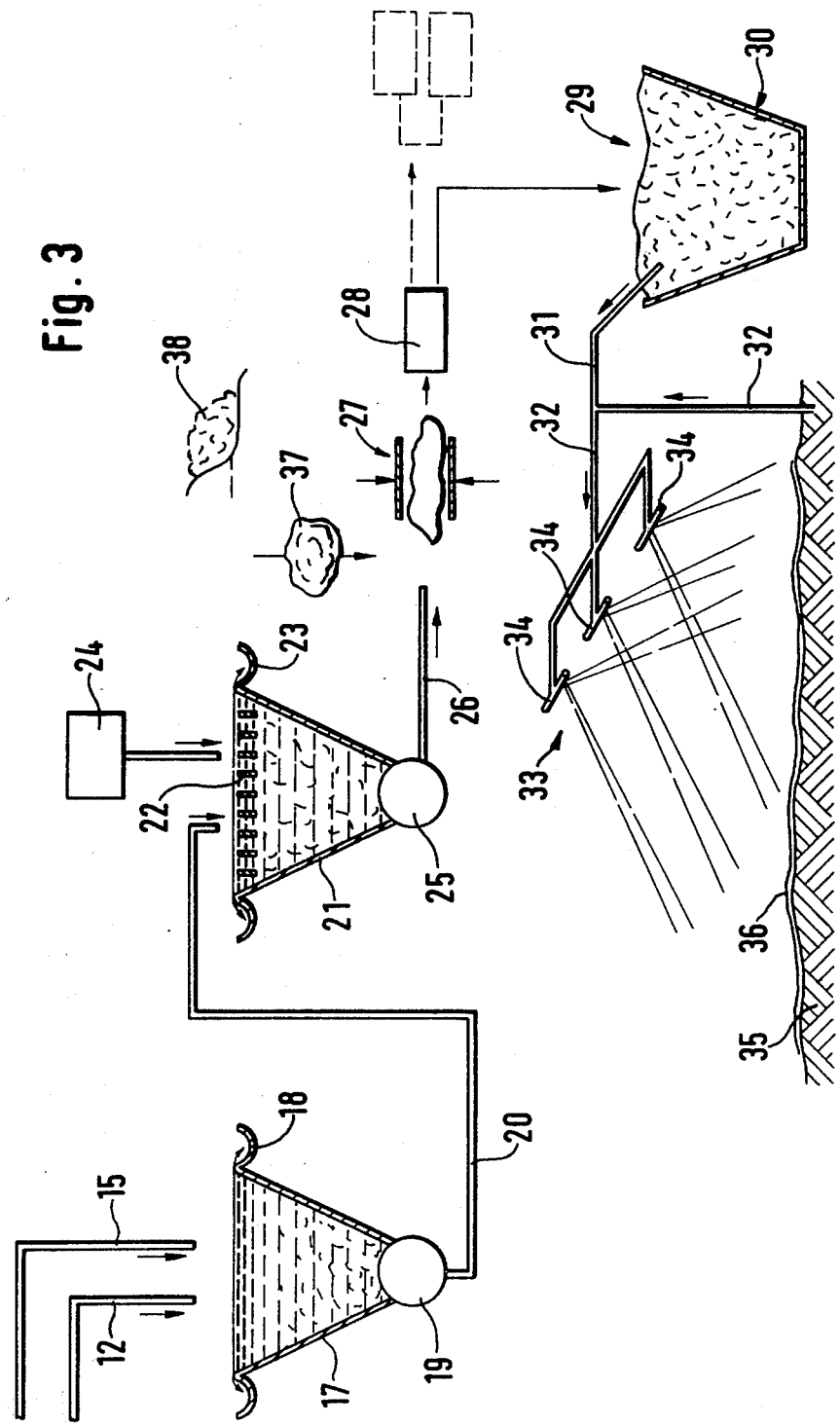

United States Patent [19]

Schmidt

[11] 4,261,725

[45] Apr. 14, 1981

[54] METHOD OF PRODUCING A FIBROUS MASS FROM PEAT AND MEANS FOR CARRYING OUT THE METHOD

[76] Inventor: Evald G. Schmidt, Skansgatan 4, Markaryd, Sweden, S-285 00

[21] Appl. No.: 62,638

[22] Filed: Aug. 1, 1979

[51] Int. Cl.³ ............................................. C05F 11/02
[52] U.S. Cl. ...................................... 71/64 SC; 47/9; 47/DIG. 10; 209/5; 209/10; 209/17; 209/173; 405/264
[58] Field of Search ................. 209/2, 5, 1 C, 17, 173, 209/250, 268, 270; 71/29, 64 SC; 47/9, DIG. 10; 162/92; 405/263, 264

[56] References Cited

U.S. PATENT DOCUMENTS

| | | | |
|---|---|---|---|
| 3,656,930 | 4/1972 | Martin | 71/24 |
| 4,012,219 | 3/1977 | Josephs | 71/64 SC X |
| 4,081,357 | 3/1978 | Werneke et al. | 209/5 |

FOREIGN PATENT DOCUMENTS 6207 of 1912 United Kingdom ..................... 162/92

Primary Examiner—William A. Cuchlinski, Jr.
Attorney, Agent, or Firm—John J. Dennemeyer

[57] ABSTRACT

The present invention relates to a method for producing a fibrous mass from peat, in which, after a primary sorting operation, the peat-material suspension is liquid-concentration regulated by supplying thereto an amount of liquid depending on the degree of humidification of the dug-up peat, and then supplying the suspension under pressure to at least one screening member having a permeability depending on the peat-fiber concentration of the peat-material after the concentration regulation.

12 Claims, 3 Drawing Figures

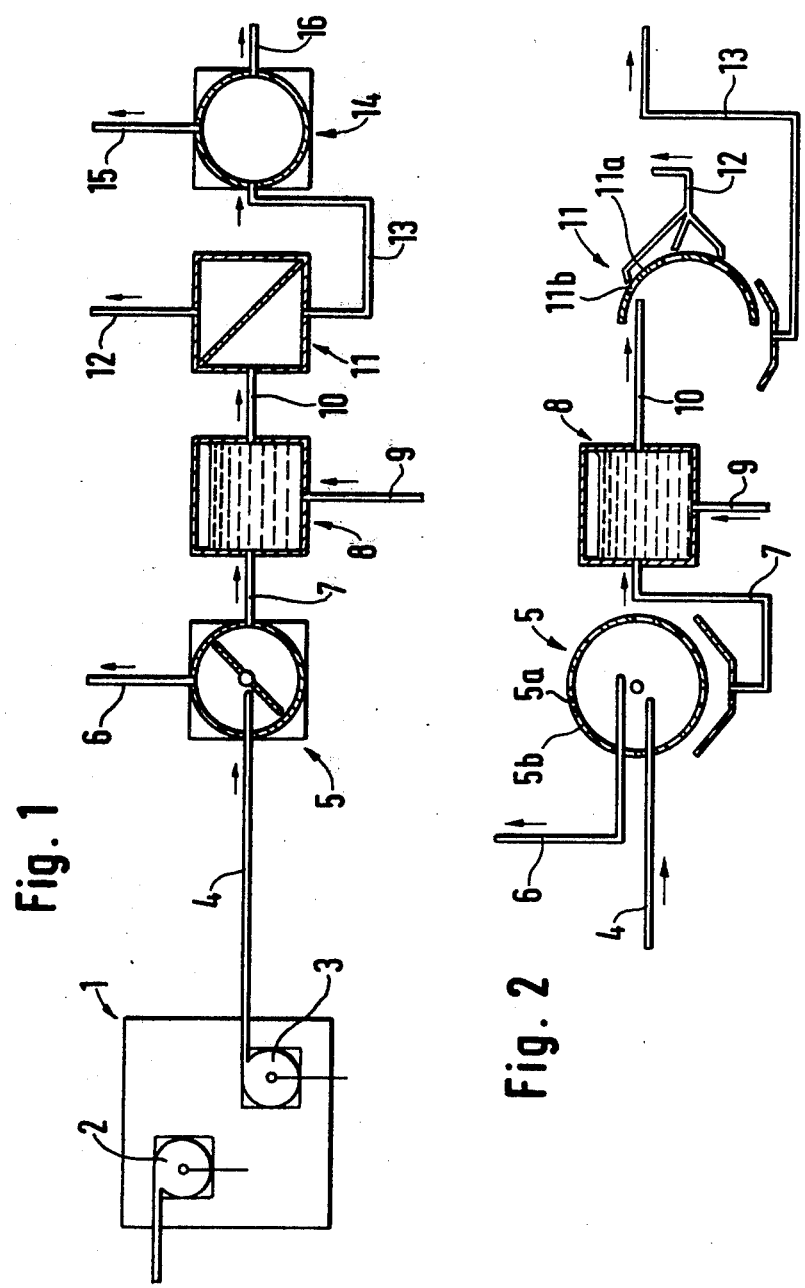

METHOD OF PRODUCING A FIBROUS MASS FROM PEAT AND MEANS FOR CARRYING OUT THE METHOD

The present invention relates to a method of producing a fibrous mass from peat, comprising carefully exposing the fibers of the peat fiber material and transferring it into a peat material suspension which is subjected to a grading or screening, classifying and sorting operation.

It has not been possible in the past to produce an easily de-watered fibrous mass from peat, while using in the production a continuous process which (1) could be carried out with a minimum of manpower requirements, (2) provides a greater yield from the peat moors than had been the case before, (3) allows an efficient separating out of colloids and particles less than 0.2 mm, and (4) enables the utilization of a simple installation, which, by a quickly made replacement of a screening member, can be changed to match the character of the dug-up peat.

It is an object of the present invention to obviate these problems, and according to the invention this is mainly realized by the fact that, after a primary sorting step, the peat material suspension is subjected to a liquid concentration (or consistency) regulation by supplying thereto an amount of liquid depending on the degree of humidification of the dug-up peat, and then supplying the suspension under pressure to at least one screening member having a permeability depending on the peat fiber concentration of the peat material suspension after this concentration regulation.

It is also an object of the present invention to provide simple means for carrying out the above-described process. This object is carried by the features disclosed in the appended claims.

The inventive method will be described in more detail hereinafter with reference to the accompanying drawings which show a diagrammatic illustration of a plant for producing a fibrous mass from peat and in which:

FIG. 1 is a diagrammatic illustration of a plant for producing a fibrous mass from peat, FIG. 2 illustrates some devices included in the plant according to FIG. 1, FIG. 3 is a diagrammatic illustration of a plant for the separation of organic matter from fiber free suspension produced by the plant according to FIG. 1.

Referring to the drawings FIG. 1 shows a carriage 1 or the like which can be moved on a peat moor. The carriage 1 has a pump 2 with at least one spray nozzle (not shown) emitting a water jet for defibrating peat material on the moor. The pumpable peat material suspension thus obtained (having a peat-fiber concentration of 1 to 6% by weight) is taken up by means of a take-up pump 3 and is conveyed by the latter through a conduit 4 to a primary sorting assembly 5 comprising, for example, at least one rotary, perforated screen having a central intake for the incoming stuff, or inject. In the primary sorting assembly 5, material greater than about 10 mm in size is separated, so that about 10 to 20% of the peat material of the suspension is separated out, e.g. through conduit 6 in the drawing. The material separated out, i.e. the rejected stuff, or reject, has a peat fiber concentration of about 6% and is suitable, for example, for burning or for soil-improvement purposes.

The accepted stuff, or accept, obtained after the primary sorting assembly 5 is a suspension with pumpable consistency because a very small proportion only of the liquid has been removed in the primary sorting assembly 5. This suspension, which contains fiber particles smaller than about 10 mm, including colloids and particles smaller than 0.2 mm, is passed through a conduit 7 to a liquid supplying assembly 8 comprising, for example, a collecting tank with a water inlet 9.

In the liquid supply assembly 8 a liquid, suitably water, is supplied in an amount such as to impart to the peat material suspension a peat fiber concentration less than 1% by weight. The higher the degree of humidification of the peat material of the moor, the more water is supplied in order to obtain a lower peat-fiber concentration.

From the table below it will be seen what peat-fiber concentration is aimed at by supplying water at different degrees of humidification (H) of the raw peat material from the moor:

| Degree of Humidification (H) as measured on the peat moor: | Water supplied in the Water Supply Assembly to reach the following peat-fiber concentration of the suspension: |
|---|---|
| 0 to 3 | max about 1% by weight |
| 3 to 6 | max about 0.75% by weight |
| above 6 | max about 0.5% by weight |

The consistency regulated peat fiber suspension, which thus has a peat fiber concentration lower than about 1% by weight, is supplied through a conduit 10 to an assembly 11 for separating colloids and particles smaller than about 0.2 mm. This assembly 11 comprises for instance a screening member having through-flow perforations about 1 mm in diameter, or smaller.

The size of the through-flow perforations of the screening member of the assembly 11 is determined in relation to the concentrations of the suspension and the degree of humidification of the peat material. The more humidified peat in the suspension and the lower its concentration, the smaller the perforations of the screening member should be in order to obtain the greatest possible yield of accept, i.e. the maximum possible amount of easily drainable peat fiber material.

From the following table it is seen what yield of easily drainable peat fiber mass can be obtained at various degrees of humidification, various peat fiber concentrations and various perforation or mesh sizes of the screening member of the assembly 11:

| Degree of humidification (H) (according to von Post's scale as referred to hereinafter) | peat fiber concentration in % by weight | Hole or mesh size of screen | Yield % |
|---|---|---|---|
| 0 to 3 | 0.75–1 | about 1 | about 90 |
| 3–6 | 0.5–0.75 | 0.5–1 | about 80–90 |
| above 6 | 0.1–0.5 | max 0.5 fine mesh net or cloth | about 70–90 |

It is seen from this table that it is possible to obtain a very high yield, i.e. usable proportion of the completely treated peat, independently of the degree of humidification of the peat moor simply by supplying a suitable amount of water to obtain a suitable peat fiber concentration, and by using in the assembly 11 a screening member having an adequate hole or mesh size.

At a peat fiber concentration in excess of about 1% by weight and a larger mesh size of the screening member than 1 mm, an essentially lower yield will be obtained, and at higher peat fiber concentrations and constant mesh size, for example, there will be a great danger of clogging the plant, resulting in a breakdown of the operation of the mill.

By utilizing in the process the values in the last-mentioned table, a peat fiber concentration increase of at least 100% will be obtained in the assembly 11, so that about 50% of the water supplied is removed, thereby removing also at least 50% of the colloids and particles smaller than about 0.2 mm, through the conduit 12, possibly for returning to the moor.

The peat fiber concentration of the suspension after the assembly 11 has a maximum of about 2% by weight, and the suspension now has a character such that it can be passed, through a conduit 13, to a take-up assembly 14 comprising an ordinary take-up filter, whereby the peat fiber concentration can be increased in a simple way to about 10% by weight, and in addition at least 75% of the remaining colloids and particles smaller than about 0.2% are carried away with the effluent water which flows away through the conduit 15, possibly for returning to the moor. The accept stuff obtained is carried away through a conduit 16 to be used, for instance, for paper-making, as a substance for cleaning purposes, for increasing the dry-substance content of various reject stuffs, as a fuel or as a soil improvement substance, or fertilizer.

Thus by utilizing the method described, a peat fiber concentration increase from lower than 1% by weight to about 10% by weight will be obtained. In practicing the production method of the invention more than one primary sorting assembly or unit 5 and more than one secondary sorting assembly or unit 11 can come into use.

It is advantageous to add the water or other suitable liquid after the primary sorting unit 5. It is essential that the water supplied through the conduit from the water supply unit is devoid of suspended particles. In other words, it is not suitable to use water directly from the peat moor, but this water will have to be cleaned from suspended particles, since otherwise the effect of the following separation process would be reduced.

To provide an extremely simple equipment for carrying out the method of the invention, the primary sorting unit 5 comprises a screening member, preferably in the form of a rotary drum 5a with perforations 5b of a diametrical size of about 10 mm. The peat material suspension is passed into this drum by the conduit 4, the rejected stuff being passed out from the drum 5a through the conduit 6, while the accept stuff is obtained by retaining the suspension passing through the perforations 5b. This accepted stuff is carried away through the conduit 7 and through the liquid supply unit 8 after supplying liquid through the conduit 10 to the secondary sorting unit 11. The latter comprises at least one stationary screening member 11a having perforations or holes 11b the sizes of which can vary as stated in the table referred to hereabove. In the present case the portion of the suspension which cannot pass through the screening member 11a is retained as accepted stuff and is passed further through conduit 13, whereas the portion of the suspension passing through the screening member 11a is removed as rejected stuff through conduit 12.

Peat material treated according to the inventive method, and preferably with the employment of the inventive equipment, can without any difficulties have imparted to it a peat fiber concentration of about 40 to 45% by weight by mechanical drainage and without any supply of heat.

The sorting or classifying operation can comprise more than one primary sorting step and more than one secondary sorting step. The primary and secondary sorting steps may be carried out in one single sorting or classifying unit, for instance at different positions in one single screening assembly.

The circuitry of the plant may be provided with or replaced by pressurizing elements, not shown and not described in detail, since pressurizing elements of any type previously known to those skilled in the art may be used, to supply the diluted suspension under pressure to the screening unit 11, preferably a so-called arc screen.

Finally it may be mentioned that the expression "particles smaller than about 0.2 mm" involves particles which totally are of sizes smaller than 0.2 mm, but preferably also particles whose smallest outer measures are about 0.2 mm, but whose largest outer measures may be larger. Thus, for instance, a particle comprised by the conception may have a length substantially larger than about 0.2 mm, but a width less than about 0.2 mm.

(von Post's scale is described in: "Planerings-rapport, Torv i Sverige 1977:1," a planning report made by the "Nämden för Energiproduktion:s Planning Board for Peat.")

The suspension effluent through conduit 12 and/or conduit 15 and containing organic materials, predominantly colloids and particles smaller than 0.2 mm, from the peat moor, which remain after the primary sorting step and the fiber separation following thereafter, is subjected to a separation process in which the organic matter is separated out from the fiber free suspension, after which the dry-substance content of the organic matter is increased by dewatering it. The organic matter thus dewatered, after storage and/or transport, may suitably again be mixed with water to be spread out over a ground area for instance to serve as a soil amelioration agent, or to form a covering layer serving, e.g. to preserve humidity in the underlying soil.

The organic matter is suitably separated out of the fiber free suspension by a sedimentation process, the sedimentation being brought about by causing the peat fiber concentration of the peat material suspension to be less than about 0.5% by weight when the degree of humidification of the dug-up peat is higher than 6 according to von Post's scale. In the last sedimentation step it may be suitable to add a flocculent, preferably a polymer, alum or other salts, in order to accelerate the sedimenting effect.

The separation of organic matter from the fiber-free suspension may suitably be carried out in a plant of the type shown in FIG. 3. This plant comprises a settling basin 17 into which the fiber-free suspension is supplied through the conduit 12 and/or 15. In this settling basin the organic matter is allowed to settle to the bottom, and the water is allowed to flow off in a well-known manner at the top edge of the basin 17, and is carried away through gutters or chutes 18. The organic matter collected in the bottom portion of the basin 17 is pumped by a pumping equipment 19 through a conduit 20 into a second settling basin 21, the pumped suspension containing 4 to 10% dry substance by weight, preferably 5 to 7% dry substance. In order to obtain efficient sedimentation, the settling basin 21 is provided at its top with laminae 22 arranged in a manner previously known per se over which water can pass before flowing over the top edges of the basin 21 to be passed on in a purified state through effluent channels 23. In order to accelerate the sedimentation efficiency in the basin 21, a flocculating agent, for instance a polymer, alum or other salts may be supplied from a storage 24 to increase the weight of the organic particles so that they will sink at a greater velocity. The organic matter collected in the bottom portion of the basin is pumped out by a pump equipment 25, and the pumpable suspension is furnished through a pipe line 26 to a dewatering station 27. At this station the suspension is dewatered, for instance by a pressing and/or centrifuging process, until the accepted stuff, the accept, has a dry-substance content of at least 10% by weight and up to 25% dry substance. The high dry-substance content now obtained has the advantage that the accept (shown as a block and designated by 28) will be handy, that it can be stacked in a space-saving manner without any need of particular storage equipment, and that it can be transported at low cost for further use.

The material blocks 28 are conveyed in their "dry condition" to a utilization area 29 where it is mixed with water so as to be spread out together therewith. At the utilization area 29 the blocks 28 may be supplied into a container 30 with water in which the blocks 28 readily dissolve. The container 30 is connected through a conduit 31 to a water-carrying conduit 32 of a conventional irrigation plant 33, whereby organic-matter-containing water will be drawn up by ejector action from the container 30 and supplied to the stream of water flowing in conduit 32. The water admixed with organic matter is sprayed through nozzles 34 over a field 35 and is deposited as a thin film 36 on this field. When the film has dried, it may be continuous if the concentration of organic matter is maintained sufficiently high. The film 36 thus formed may be utilized for preventing wind erosion and for preserving humidity in the underlying soil. It further has soil amelioration properties and thus can be used as a soil amelioration agent, in which case it is mixed with the organic dry-substance in a manner to cause 10 to 20 g dry-substance to be spent on each square meter of the field surface. The film also is well adapted to coat sown seeds, particularly when they lie on the surface and are especially sensitive during the germination period.

In order to increase the dry-substance content of the accept-stuff obtained from the separation process, the latter may have dry-substance added to it, for instance peat substance from the same peat moor 38 from which the peat fibers have also been taken. This dry-substance 37 may be added instead of pressing and/or centrifuging or in combination therewith.

Portions of the dewatered accept stuff can be used for producing material for combustion purposes or for lubrication purposes, or as raw materials for chemical industry or as additives in casting.

The separation process described hereinbefore is suitably a sedimentation process, but other methods for separating the organic material can also be applied. The different stages and units of the plant illustrated in FIG. 3 can be varied within wide limits without departing from the general scope of the invention.

The inventive methodology implies the advantage that not only the peat fibers, but also smaller particles are made use of so that the peat fiber extraction will only reject roots and other larger components of the peat moor and pure or substantially pure water. These remnant products may be disposed of, for example returned into the peat moor, without any danger of interference with the natural environment.

What is claimed is:

1. A method of producing a peat fiber concentrate comprising the steps of:
    (a) measuring the degree of humidification of raw peat on a peat moor;
    (b) excavating peat from the peat moor;
    (c) suspending the excavated peat in water;
    (d) subjecting the peat suspension from step (b) to a primary sorting operation wherein oversize material is removed from said suspension;
    (e) adjusting the peat fiber concentration of the sorted peat suspension from step (d) by adding to said suspension an amount of water sufficient to provide a selected peat fiber concentration one percent by weight or less depending upon the initial degree of humidification of the raw peat whereby the consistency of the peat suspension is adjusted to a desired level;
    (f) providing a screening member having a selected permeability depending upon the adjusted peat fiber concentration of the peat suspension from step (e); and
    (g) subjecting the peat suspension from step (f) to a secondary sorting operation by passing the suspension through said screening member to produce a concentrated peat fiber suspension and a substantially fiber-free effluent containing colloids and particles less than 0.2 mm in size.

2. A method according to claim 1, wherein in the primary sorting operation, material greater than about 10 mm in size is removed from the peat suspension.

3. A method according to claim 1 wherein the initial degree of humidification of the raw peat according to VonPost's scale is from 0 to 3; the amount of water added to the peat suspension after the primary sorting operation is sufficient to adjust the peat fiber concentration to between about 0.75 and about 1 weight percent, and the screen member is selected to have perforations about 1 mm in diameter.

4. A method according to claim 1 wherein the initial degree of humidification of the raw peat according to VonPost's scale is from 3 to 6; the amount of water added to the peat suspension after the primary sorting operation is sufficient to adjust the peat fiber concentration to between about 0.5 and about 0.75 weight percent, and the screen member is selected to have perforations between about 0.5 and about 1 mm in diameter.

5. A method according to claim 1, wherein the initial degree of humidification of the raw peat according to VonPost's scale is greater than 6; the amount of water added the peat suspension after the primary sorting operation is sufficient to adjust the peat fiber concentration to between about 0.1 to about 0.5 weight percent, and the screen member is selected to have perforations not greater than 0.5 mm in diameter.

6. A method according to claim 1, wherein said secondary sorting operation is effected by passing the suspension under pressure through said screening member.

7. A method according to claim 1, further comprising the steps of:

(h) separating organic matter from the substantially fiber-free effluent produced in step (g), and
(i) dewatering the separated organic matter.

8. A method according to claim 7, wherein the separated organic matter consists essentially of colloids and particles smaller than 0.2 mm.

9. A method according to claim 8, wherein the separation of the organic matter from the effluent is effected in a two stage sedimentation process comprising a first sedimentation stage from which a suspension containing from 4 to 10 weight percent dry substance is obtained and a second sedimentation stage from which a suspension is obtained that after dewatering has a dry substance content of from 12 to 25 weight percent.

10. A method according to claim 9, wherein a flocculating agent is added to said second sedimentation stage to enhance the separation of the organic matter from the effluent.

11. A method according to claim 10, wherein said flocculating agent is a polymeric flocculating agent.

12. A method of treating soil comprising mixing fiber-free organic matter obtained according to any one of claims 6, 7 or 8 with water and spraying the resulting fiber-free aqueous mixture on the soil.

* * * * *